UNITED STATES PATENT OFFICE.

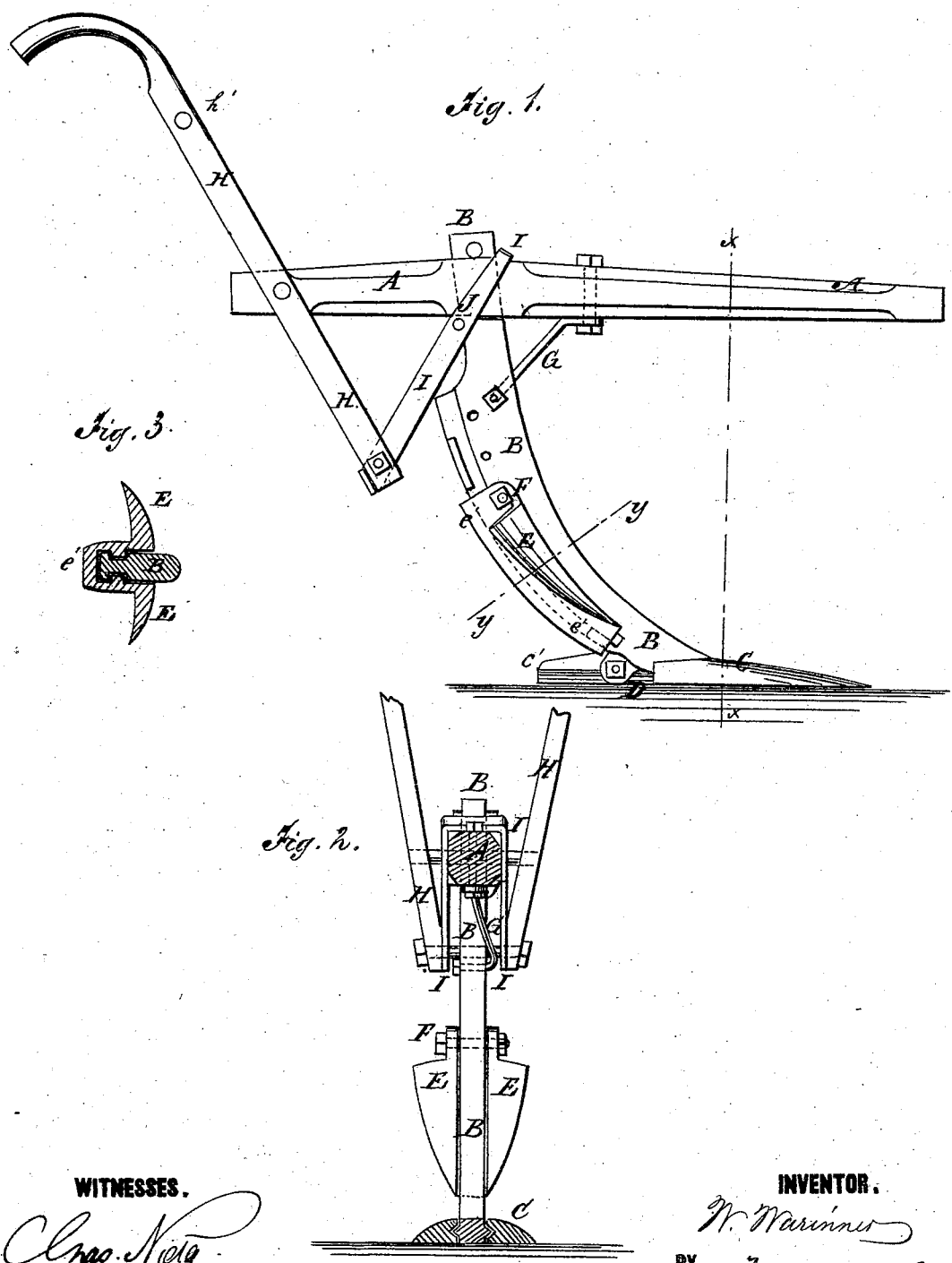

WILLIAM WARINNER, OF CREELSBOROUGH, KENTUCKY.

IMPROVEMENT IN PLOWS.

Specification forming part of Letters Patent No. 152,201, dated June 16, 1874; application filed April 18, 1874.

*To all whom it may concern:*

Be it known that I, WILLIAM WARINNER, of Creelsborough, in the county of Russell and State of Kentucky, have invented a new and useful Improvement in Combined Subsoil and Cultivating Plow, of which the following is a specification:

Figure 1 is a side view of my improved plow. Fig. 2 is a front view of the same, partly in section, through the line $x\ x$, Fig. 1. Fig. 3 is a detail cross-section of the standard and wings, taken through the line $y\ y$, Fig. 1.

Similar letters of reference indicate corresponding parts.

My invention has for its object to furnish an improved plow for loosening the subsoil around small plants, and at the same time throwing soil around them, and which shall be simple in construction and readily adjusted to throw less or more soil around the plants, as may be desired. This invention consists in the wing or wings, provided with a grooved and tongued rib, in combination with the grooved rear edge of the plow-standard; and in the U-bar and its bolt, in combination with the handles, the plow-beam, and the standard, to serve as a support to said handles, and a collar to said beam and standard, as hereinafter fully described.

A represents the plow-beam, to which is attached the upper end of the standard B, which is made long and strong. The lower end of the standard B curves forward, and its forward edge is made sharp to adapt it to serve as a colter. Upon the opposite sides of the lower end or foot of the standard B are formed V-shaped ribs, to enter grooves in the sides of the slot in the subsoil-point C. The point C is made flat upon its lower side, and convex upon its upper side, and has a rearward-extending arm, $c'$, formed upon its rear end, to serve as a heel or land-side to the plow to give it steadiness of motion when at work. The point C is secured upon the lower end of the standard B by a bolt, D, which passes through the standard B and the arm $c'$ of the point C, as shown in Fig. 1. E are the wings, which are made with a central connecting-rib, $e'$, which is grooved upon its forward side to receive and fit upon the rear edge of the standard B, and has inwardly-projecting ribs, tongues, or feathers formed upon the sides of its groove, which enter upon the opposite sides of the rear part of the standard to firmly support the said wings. The ribs and grooves of the wings E and standard B are interrupted near their upper end, so that the said wings may be slipped off when raised to the proper height. The wings E are secured in place upon the standard B by a bolt, F, which passes through the said wings and standard, as shown in Figs. 1 and 2. Several holes are formed in the standard B to receive the bolt F, so that the wings E may be raised and lowered to adjust them to throw less or more soil around the plants, as may be desired.

The wings E may be made wide or narrow; may be made more or less curved; or one of them may be omitted, so that the soil may be thrown only one way.

The draft strain upon the standard B is sustained by a brace-rod, G, the lower end of which is attached to the said standard, and its upper end is attached to the beam A. H are the handles, which are attached to the rear end of the beam A, and their upper parts are connected and held in their proper relative positions by a round, $h'$. The lower ends of the handles H project below the beam A, and are bolted to the ends of the U-bar I, the middle part or bend of which passes over the beam A, just in front of the upper end of the standard B, and the arms of which are connected below said beam, and in the rear of said standard by a bolt, J, so as to serve as a strengthening-collar to the beam and standard at their point of attachment.

Having thus described my invention, I claim as new and desire to secure by Letters Patent—

1. The wing or wings E, provided with a grooved and tongued rib, $e'$, in combination with the grooved rear edge of the standard B, substantially as herein shown and described.

2. The U-bar I and bolt J, in combination with the handles H, the plow-beam A, and the standard B, to serve as a support to said handles, and a collar to said beam and standard, substantially as herein shown and described.

WILLIAM WARINNER.

Witnesses:
JOHN E. BUSTER,
C. C. BUSTER.